US010746517B2

United States Patent
Raczek et al.

(10) Patent No.: US 10,746,517 B2
(45) Date of Patent: Aug. 18, 2020

(54) METHOD AND DEVICE FOR ASCERTAINING A TEMPERATURE, AND METHOD AND DEVICE FOR JOINING PROPELLANT CHARGE MODULES

(71) Applicant: KRAUSS-MAFFEI WEGMANN GMBH & CO. KG, Munich (DE)

(72) Inventors: Matthias Raczek, Kassel (DE); Matthias Czok, Kassel (DE); Lothar Melcher, Kassel (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 0 days.

(21) Appl. No.: 16/314,835

(22) PCT Filed: Jun. 27, 2017

(86) PCT No.: PCT/DE2017/100538
§ 371 (c)(1),
(2) Date: Jan. 2, 2019

(87) PCT Pub. No.: WO2018/006902
PCT Pub. Date: Jan. 11, 2018

(65) Prior Publication Data
US 2019/0346244 A1  Nov. 14, 2019

(30) Foreign Application Priority Data
Jul. 7, 2016  (DE) .......................... 10 2016 112 510

(51) Int. Cl.
*F42B 5/38* (2006.01)
*F42B 35/00* (2006.01)
(Continued)

(52) U.S. Cl.
CPC ................ *F42B 35/00* (2013.01); *F42B 5/38* (2013.01); *G01J 5/041* (2013.01); *G01J 5/0809* (2013.01)

(58) Field of Classification Search
CPC .. F42B 5/38; F42B 5/188; F42B 5/192; F42B 5/18; F42B 35/00; Y10S 102/70; G01J 5/041; G01J 5/0809
(Continued)

(56) References Cited

U.S. PATENT DOCUMENTS 3,176,617 A * 4/1965 Brafford ................. F42B 5/025
102/282
4,363,273 A * 12/1982 Luebben ................. F42B 5/196
102/431
(Continued)

FOREIGN PATENT DOCUMENTS

DE   10209752 A1   10/2002
EP   0533642 A1   3/1993
(Continued)

OTHER PUBLICATIONS

PCT, European Patent Office (ISA/EP), International Search Report (English Translation), International Application No. PCT/DE2017/100538, 4 pages, dated Sep. 20, 2017.
(Continued)

*Primary Examiner* — Michael D David
(74) *Attorney, Agent, or Firm* — Thompson Hine LLP

(57) ABSTRACT

A method and device for ascertaining the temperature of a propellant charge (22) and a method and device for joining together propellant charge modules (2) to form a propellant charge (22). The method and device for ascertaining the temperature of a propellant charge (22) includes at least temporarily arranging a sensor head (4) which is movable with respect to the propellant charge (22) in a cavity (7) of
(Continued)

the propellant charge (22); and ascertaining the temperature of the propellant charge (22) at least while the sensor head (4) is arranged in the cavity (7) of the propellant charge (22). The propellant charge modules (2) are positioned between stops (9) and are joined together by movement of at least one of the stops toward the other.

24 Claims, 2 Drawing Sheets

(51) Int. Cl.
    *G01J 5/04*         (2006.01)
    *G01J 5/08*         (2006.01)

(58) Field of Classification Search
    USPC ............................. 102/431, 435, 282, 700
    See application file for complete search history.

(56) References Cited

U.S. PATENT DOCUMENTS

| | | | | |
|---|---|---|---|---|
| 4,918,982 | A * | 4/1990 | Pischinger | F02B 77/089 |
| | | | | 73/114.09 |
| 5,052,304 | A * | 10/1991 | Rahnenfuhrer | F42B 5/181 |
| | | | | 102/431 |
| 5,151,557 | A * | 9/1992 | Bracuti | F42B 5/196 |
| | | | | 102/435 |
| 5,218,166 | A * | 6/1993 | Schumacher | C06B 21/0016 |
| | | | | 102/431 |
| 5,269,224 | A * | 12/1993 | Gonzales | F42B 5/16 |
| | | | | 102/275.11 |
| 5,454,323 | A * | 10/1995 | Conil | F42B 5/188 |
| | | | | 102/282 |
| 5,463,956 | A * | 11/1995 | Harting | F42B 5/24 |
| | | | | 102/282 |
| 5,565,643 | A * | 10/1996 | Raines | C06B 23/04 |
| | | | | 102/289 |
| 5,747,723 | A * | 5/1998 | Buckalew | F42B 5/38 |
| | | | | 102/282 |
| 7,007,547 | B2 | 3/2006 | Philipp et al. | |
| 7,872,815 | B2 | 1/2011 | Sonderegger et al. | |
| 8,597,444 | B1 * | 12/2013 | Young | C06B 23/002 |
| | | | | 149/108.4 |
| 8,881,634 | B1 * | 11/2014 | Worrell, Jr. | F42B 5/188 |
| | | | | 86/10 |
| 9,360,263 | B2 | 6/2016 | Raczek et al. | |
| 9,377,277 | B1 * | 6/2016 | Worrell, Jr. | F42B 5/067 |
| 9,625,242 | B1 | 4/2017 | Elalem et al. | |
| 2002/0134138 | A1 | 9/2002 | Philipp et al. | |
| 2008/0239518 | A1 | 10/2008 | Sonderegger et al. | |
| 2012/0325075 | A1 | 12/2012 | Raczek et al. | |
| 2019/0346244 | A1 * | 11/2019 | Raczek | G01J 5/041 |

FOREIGN PATENT DOCUMENTS

| | | |
|---|---|---|
| EP | 0538219 A1 | 4/1993 |
| EP | 0855582 A1 | 7/1998 |
| GB | 2168811 A | 6/1986 |
| GB | 2358059 A | 7/2001 |
| JP | 2015152197 A | 8/2015 |
| WO | 2005/080938 A1 | 9/2005 |
| WO | 2009/120694 A2 | 10/2009 |
| WO | 2011/072673 A2 | 6/2011 |
| WO | 2011/072674 A1 | 6/2011 |

OTHER PUBLICATIONS

PCT, The International Bureau of WIPO, International Preliminary Report on Patentability (English Translation), International Application No. PCT/DE2017/100538, 13 pages, dated Jan. 17, 2019.

* cited by examiner

METHOD AND DEVICE FOR ASCERTAINING A TEMPERATURE, AND METHOD AND DEVICE FOR JOINING PROPELLANT CHARGE MODULES

TECHNICAL FIELD

The present invention relates to a temperature ascertaining device for a propellant charge and to a method for ascertaining the temperature of a propellant charge. The invention also relates to a joining device for carrying out a joining movement for joining together propellant charge modules to form a propellant charge and to a method comprising a joining movement for joining together propellant charge modules to form a propellant charge.

BACKGROUND

Ammunition in the case of heavy weapons, such as artillery guns or combat tanks, may consist of a projectile and a propellant charge, which can be introduced into the barrel of the weapon either individually or together (cartridged). In the case of non-cartridged ammunition, it may also be provided that the propellant charge in turn comprises a plurality of propellant charge modules which are joined together to form a combined propellant charge before the introduction of the propellant charge modules into the barrel of the weapon, during the introduction of the propellant charge modules into the barrel of the weapon or after the introduction of the propellant charge modules into the barrel of the weapon.

To be able to engage a target with the weapon or with the projectile, a fire control solution must be ascertained. The direction of the weapon is thereby ascertained in dependence on the weapon, the ammunition and external influences, such as wind data. Subsequently, the weapon can be aligned in azimuth and elevation according to the fire control solution determined and subsequently fired. It is known in this respect that the temperature of the propellant charge represents an important influencing variable in the ascertainment of fire control solutions for modern weapon systems, because, when firing the weapon, the temperature of the propellant charge influences the exit velocity $v_0$ of the projectile, and consequently the flight path or the firing range of the projectile.

Lack of or insufficient allowance for the temperature of the propellant charge accordingly leads to an influencing of the hit accuracy of the weapon.

Correspondingly, various devices and methods for minimizing the influence of the temperature of a propellant charge or making allowance for it in the determination of the fire control solution are already known from the prior art.

On the one hand, it is known to thermally precondition propellant charges or store them in a thermally preconditioned state, in order to achieve a temperature of the propellant charge that is defined as accurately as possible at the moment of ignition or firing of the weapon. However, this has the disadvantage that the thermal conditioning of the propellant charges is complex and energy-intensive and, in addition, does not achieve the necessary accuracy, so that the hit accuracy of the weapon is still disadvantageously influenced.

In addition, methods in which the temperature of the propellant charge is measured by measuring the temperature of the outer surface of the propellant charge are known. These methods have the disadvantage however that the surface temperature or the temperature of the outer surface of the propellant charge is subject to a large number of external influences, and consequently measuring the temperature of the outer surface of the propellant charge likewise only represents an inaccurate estimate of the actual temperature of the propellant charge.

Also already known are propellant charges in which a temperature sensor and corresponding transmission electronics are comprised by the propellant charge, in order to be able to determine the internal temperature or core temperature of the propellant charge by means of a corresponding readout unit in combination with the transmission electronics and the sensor. This solution does allow a relatively accurate determination of the core temperature of the propellant charge. But the susceptibility to interference and faults on account of the required transmission of data and the correspondingly complex and costly production of the propellant charges due to the use of a disposable temperature sensor and corresponding transmission electronics are disadvantageous.

SUMMARY

The present invention is accordingly based on the object of allowing a more accurate determination of a fire control solution, in particular by means of a more accurate ascertainment of the temperature of the propellant charge.

This object is achieved in the case of a temperature ascertaining device for propellant charges in that the temperature ascertaining device comprises a sensor head which is variable in a relative position in relation to the propellant charge and, for ascertaining the temperature of the propellant charge, is at least temporarily arranged in a cavity of the propellant charge.

This means that the sensor head can in principle assume a measuring position or measuring setting and a rest position or rest setting. In this case, the transfer between the rest position and the measuring position is not necessarily attributable to a movement of the sensor head itself. Rather, the measuring position and the rest position are defined by the spatial arrangement of the sensor head with respect to the propellant charge. A movement of the sensor head with respect to the temperature ascertaining device is not absolutely necessary. The measuring position therefore represents the position of the sensor head in which, for measuring the temperature, the sensor head is arranged in a cavity of the propellant charge. Accordingly, the rest position of the sensor head represents that position in which the sensor head is arranged outside the cavity of the propellant charge, in particular outside the propellant charge.

Consequently, not only a change in the position of the propellant charge in the temperature ascertaining device but also a change in the position of the sensor head in the temperature ascertaining device and also a change in the position of the propellant charge and the sensor head in the temperature ascertaining device can lead to a corresponding change in the relative position between the propellant charge and the sensor head.

The basic idea according to the invention envisages determining the temperature of the propellant charge as accurately as possible. This is achieved by at least temporarily introducing a sensor head into a cavity of the propellant charge. A temperature that comes closest to the actual temperature of the propellant charge prevails in the cavity of the propellant charge. As a result, a particularly precise measurement of the temperature of the propellant charge can be performed by introducing the sensor head into the cavity of the propellant charge and ascertaining the temperature while the sensor head is arranged in the cavity of the propellant charge.

The propellant charge may in this case be joined together from a number of propellant charge modules shortly before, during or after the sensor head is arranged in the cavity of the propellant charge. This also means that the cavity of the propellant charge can be formed by one or more cavities of propellant charge modules. These individual cavities of the respective propellant charge modules may be connected to one another or separate from one another.

According to a first advantageous refinement of the temperature ascertaining device, it is provided that the temperature ascertaining device is designed so as to make it possible to measure the temperature of an inner surface of the propellant charge adjoining the cavity. The inner surface of the propellant charge adjoining the cavity may also be the surface of the propellant charge bounding the cavity. This inner surface or surface of the propellant charge is particularly preferred for measuring the temperature because it is dependent even less on external influences than the cavity itself, and accordingly makes it possible to determine the actual temperature of the propellant charge even better.

It is particularly desirable that the ascertainment of the temperature of the propellant charge is performed directly before the firing of the weapon and also as accurately as possible. It is also particularly advantageous if the firing cadence of the weapon is not adversely influenced by the use of the temperature ascertaining device, that is to say the ascertainment of the temperature by means of the temperature ascertaining device can be performed as quickly as possible.

Accordingly, a further particularly preferred embodiment of the temperature ascertaining device provides that the temperature ascertaining device carries out the ascertainment of the temperature of the propellant charge within one second or less to an accuracy of within 1° C. or more accurately.

Known propellant charges and propellant charge modules comprise a pasteboard tube in which for example nitrocellulose is arranged as the actual propellant. Nitrocellulose is hygroscopic and is accordingly protected by the pasteboard tube from the ingress of moisture. The device according to the invention is designed so as to allow the pasteboard tube to be penetrated by the sensor head, although in principle this makes it possible for moisture to get in. Indeed, it is therefore particularly desirable that the sensor head is arranged in the propellant charge for as short a time as possible. Furthermore, it may be particularly advantageous if the sensor head is arranged in the propellant charge just before the firing of the weapon, because in this way the remaining time in which moisture can get in is minimized.

Also provided is a particularly desirable design of the temperature ascertaining device in which the sensor head comprises a sensor for contactless ascertainment of the temperature. In this way it is made possible that the sensor head arranged in the measuring position or in the cavity of the propellant charge while the ascertainment of the temperature is being carried out can carry out the ascertainment of the temperature without contacting the propellant charge, in particular the inner surface to be measured of the propellant charge. This on the one hand this makes safe handling of the temperature ascertaining device possible. On the other hand, a particularly quick and simple ascertainment of the temperature is also made possible in this way, because using a sensor for ascertaining the temperature contactlessly makes it possible to perform a contactless ascertainment of the temperature, which can be carried out particularly quickly and safely.

The sensor may for example perform an ascertainment of a temperature by using electromagnetic waves. Such measuring sensors, for example optical measuring sensors, may be used with preference for contactless ascertainment of the temperature. The sensor could for example comprise a laser source and a photosensor and carry out the ascertainment of the temperature on the basis of reflected laser light.

According to a further particularly advantageous embodiment, it is also provided that the sensor head comprises optical components, which serve at least for guiding and/or coupling out and/or coupling in measuring radiation on the basis of which the ascertainment of the temperature is performed. The optical components comprised by the sensor head allow particularly advantageous guidance of a measuring radiation both in the sensor head and outside the sensor head. In the case of contactless ascertainment of the temperature by means of a measuring radiation, particularly advantageous positioning of a sensor in the sensor head can also be achieved by the provision of corresponding optical components. This is so because, by means of the corresponding optical components, the measuring radiation can be guided in or through the sensor head, coupled out and correspondingly coupled in again.

The measuring radiation may be for example laser radiation with a wavelength that is not necessarily visible.

Furthermore, it is particularly advantageous if the optical components are arranged such that, when there is coupling out of the measuring radiation from the sensor head, the measuring radiation impinges on the inner surface of the propellant charge substantially at right angles. Among the effects achieved as a result is that the measuring radiation impinges on the inner surface of the propellant charge substantially in the same direction in which it is reflected by the inner surface of the propellant charge. This in turn has the advantage that the number of optical components for coupling in and coupling out the measuring radiation can be reduced. In particular, both the coupling out and coupling in of the measuring radiation can be accomplished by means of the same optical components. Furthermore, as a result the region of the inner surface of the propellant charge that is acted on by the measuring radiation can be minimized, so that an even more precise ascertainment of the temperature is possible.

According to a further advantageous design of the temperature ascertaining device, it is provided that the temperature ascertaining device comprises a communication interface, with which the temperatures ascertained are transmitted, in particular to a fire control device. This achieves the effect that the temperature measured by the temperature ascertaining device by means of the sensor head in the interior of the propellant charge, in particular in a cavity thereof, which allows a very precise inference of the actual temperature of the propellant charge, is transmitted to a fire control device and allowance is made for it in the calculation or determination of the fire control solution.

The aforementioned object of the invention is achieved in the case of a joining device for carrying out a joining movement for joining together propellant charge modules to form a propellant charge by the joining device comprising a temperature ascertaining device according to one of the embodiments described above.

It is consequently made possible by the joining device according to the invention that an ascertainment of the temperature of the propellant charge can be performed simultaneously in the course of the joining movement. This on the one hand has the advantage that the ascertainment of the temperature can be integrated in the other method steps prior to the firing of the weapon. Consequently, the ascertainment of the temperature of the propellant charge does not prolong the operation of loading the weapon, and consequently also does not lead to any impairment of the cadence of the weapon. Moreover, the ascertainment of the temperature can be performed particularly accurately or exactly.

It should be noted here that the joining movement does not necessarily have to be carried out in order for the actual joining together of propellant charge modules to form a propellant charge also to be carried out. This means that, in the case in which a weapon with only one propellant charge module is to be fired or is fired, a joining device can carry out a corresponding joining movement and have a corresponding temperature ascertaining device without any joining together of propellant charge modules taking place. In this case, the terms propellant charge module and propellant charge are synonymous.

Furthermore, a joining device for carrying out a joining movement for joining together propellant charge modules to form a propellant charge that has a temperature ascertaining device as described above provides a particularly advantageous way of combining particularly effectively and synergetically the movements of the propellant charge modules that are required for joining together the propellant charge modules with the temporary arrangement of the sensor head in a cavity of the propellant charge that is required or necessary for ascertaining the temperature of the propellant charge.

A synergetic combination of the temperature ascertainment with further processes or method steps prior to the firing of a weapon can however also be achieved irrespective of whether there is one propellant charge module or more than one propellant charge module. For example, it may be provided that the carrying out of the joining movement of the joining device is at the same time part of a loading operation during which the propellant charge module or the propellant charge modules are loaded into a barrel of a weapon. It can in this way be achieved that the ascertainment of the temperature and the loading of the weapon are performed simultaneously, it also being possible when using a number of propellant charge modules that the joining together to form a unitary propellant charge can take place at the same time.

According to an advantageous design of the joining device, it is provided that the joining device comprises at least one joining stop for joining together the propellant charge modules to form a propellant charge. To be understood as a joining stop in the context of the present disclosure are such elements that temporarily come into contact with or come to lie in abutment with a propellant charge module or a propellant charge at least while a joining movement is being carried out and at least temporarily exert on the at least one propellant charge module during the contact or during the abutment a joining force which, when using more than one propellant charge module, brings about the joining together of a number of propellant charge modules to form a propellant charge.

According to a further embodiment, it may be provided that at least one joining stop is designed as movable in a joining direction. The movably designed joining stop allows for example the individual propellant charge elements to be changed in their relative position in relation to one another and a corresponding joining force to be applied, which brings about the joining together of the propellant charge modules to form a propellant charge.

According to a further, particularly preferred embodiment, it is provided that at least one joining stop has a clearance, which is dimensioned such that at least a front part of the sensor head of the temperature ascertaining device can pass through the joining stop in a joining direction. This makes it possible in a particularly advantageous way that the ascertainment of the temperature of the propellant charge is performed in the course of the joining movement for joining together the propellant charge modules to form a propellant charge. This is so because the corresponding clearance for at least a front part of the sensor head to pass through makes it possible that, directly before, during or directly after the contacting or abutting of the joining stop with a propellant charge module of the propellant charge, and consequently shortly before, during or shortly after the carrying out of the joining movement for joining together the propellant charge modules to form a propellant charge, the sensor head of the temperature ascertaining device is introduced into the cavity of the propellant charge, that is to say is transferred into the measuring position, and correspondingly the ascertainment of the temperature of the propellant charge can be carried out.

As a result, the ascertainment of the temperature can be performed without any significant additional expenditure of time in the course of joining together the propellant charge modules.

According to a further, particularly preferred embodiment, it is provided that at least one joining stop is spring-loaded in the joining direction. This achieves the effect for example that a joining force occurring during the joining movement for joining together the propellant charge modules to form a propellant charge does not exceed a defined limit value. Accordingly, safe handling of the propellant charge modules and safe joining together of the propellant charge modules to form a propellant charge are achieved.

Furthermore, spring loading of at least one joining stop of the joining device in conjunction with the temperature ascertaining device according to the invention also has the advantage, however, that a reversible movement of the joining stop carried out counter to the spring loading, and consequently a corresponding movement of the propellant charge module, the propellant charge modules or the propellant charge, can be used particularly advantageously to arrange the sensor head of the temperature ascertaining device in a cavity of the propellant charge.

This means that a movement of the joining stop counter to the spring loading by means of a corresponding joining force applied by or by means of the propellant charge modules and an accompanying movement of the propellant charge modules can be used in order to transport the sensor head from the rest position with respect to the propellant charge into the measuring position with respect to the propellant charge. Conversely, an at least partial relaxation of the spring of a spring-loaded joining stop can be used for the purpose of transferring the sensor head of the temperature ascertaining device from a measuring position with respect to the propellant charge into a rest position with respect to the propellant charge.

According to a further, particularly advantageous embodiment, it is provided that the sensor head is designed as immovable in the joining direction. This achieves the effect of increased stability of the sensor head, which makes it possible at the same time for the sensor head to penetrate into the cavity of the propellant charge and carry out the measurement of the temperature or ascertainment of the temperature there.

The object of the present invention mentioned at the beginning is achieved in the case of a method for ascertaining the temperature of a propellant charge in that a sensor head which is variable in a relative position in relation to the propellant charge is at least temporarily arranged in a cavity of the propellant charge and the ascertainment of the temperature of the propellant charge is performed at least while the sensor head is arranged in the cavity of the propellant charge. According to the invention, with the method an ascertainment of the temperature can be performed particularly accurately.

In an advantageous development of the method, it is also provided that the temperature of an inner surface of the propellant charge adjoining the cavity of the propellant charge is ascertained. Ascertainment of the temperature at the inner surface of the propellant charge adjoining the cavity is particularly advantageous here on the one hand because the cavity of the propellant charge is suitable for introducing or arranging the sensor head and also because the inner surface of the propellant charge represents a particularly good measure of or a particularly good measuring point for the actual temperature of the propellant charge.

Furthermore, the inner surface is subjected to less external influences than the cavity itself. Thus, for example, the penetrating or arranging of the sensor head into or in the cavity itself can already lead to a heat exchange taking place between the cavity and the surroundings that falsifies the temperature of the cavity itself. However, a resultant heat exchange with the inner surface of the propellant charge happens much more slowly, so that even after arranging the sensor head in the cavity of the propellant charge a sufficiently accurate ascertainment of the temperature at the inner surface of the cavity can still be performed.

A further design of the method provides that the temperature of the propellant charge is ascertained within one second or less to an accuracy of within 1° C. or more accurately. In this way it can be prevented that the ascertainment of the temperature adversely influences the firing cadence of the weapon.

It may also be advantageously provided that the ascertainment of the temperature is performed on the basis of a measuring radiation which is at least guided and/or coupled out and/or coupled in by means of optical components of the sensor head. The use of measuring radiation for ascertaining the temperature has not only the advantage that a contactless ascertainment of the temperature can be performed, but also the advantage that the ascertainment of the temperature can be performed quickly and accurately.

Electromagnetic radiation in the infrared wavelength range may be used for example as measuring radiation. Laser radiation may also be used.

A further, particularly advantageous design of the method provides that the temperature is measured contactlessly. Contactless ascertainment of the temperature is appropriate in particular because it makes it possible to prevent damage to the propellant charge or other modification of the propellant charge, which possibly adversely influences its properties. Furthermore, the ascertainment of the temperature can be carried out quickly and safely.

According to a further, preferred embodiment of the method, it is provided that, when there is coupling out of the measuring radiation from the sensor head, the measuring radiation impinges on the inner surface of the propellant charge substantially at right angles.

As a result, on the one hand simple ascertainment of the temperature is made possible and on the other hand an advantageous and simple design of the sensor head is allowed. This is so because, after the impingement of the measuring radiation on the inner surface of the propellant charge at right angles, the measuring radiation is reflected back in the same direction by the inner surface and can accordingly be coupled into the sensor head again over the same propagation path as in the case of the coupling out, but in the opposite direction, and be guided in the sensor head, in particular be guided to a sensor.

Also provided is a method variant in which the ascertained temperatures are transmitted by means of a communication interface, in particular to a fire control device. In this way, allowance for the temperatures ascertained can be made in the course of a fire control solution and the accuracy of the weapon can also be increased correspondingly on the basis of the temperatures determined.

The object of the present invention defined above is also achieved by a method comprising a joining movement for joining together propellant charge modules to form a propellant charge, the method comprising a method for ascertaining the temperature of a propellant charge on the basis of one of the embodiments described above.

Also in the case of the method, the carrying out of the joining movement is intended to be decisive even if there is only one propellant charge module and no actual joining together takes place. The joining movement may in this case be for example part of a loading movement of a loading procedure by which an individual propellant charge module or a plurality of propellant charge modules is or are loaded into a barrel of a weapon.

A method comprising a joining movement for joining together propellant charge modules to form a propellant charge which comprises a method for ascertaining the temperature in the manner described above has the advantage that the movements of the propellant charge modules or of the propellant charge in the course of the joining movement can be combined particularly advantageously and synergetically with the necessary movements for arranging the sensor head in a cavity of the propellant charge. In addition, such a method has the advantage that the various objects, specifically the joining together of the propellant charge modules to form a propellant charge or at least the carrying out of the joining movement and the ascertainment of the temperature of the propellant charge can be carried out at the same time or at overlapping times, so that in particular the operation of loading the weapon and consequently the cadence of the weapon are not adversely influenced by the method for ascertaining the temperature.

In the course of the method comprising the joining movement for joining together propellant charge modules to form a propellant charge, it may be provided with particular preference that the joining movement is performed by means of at least one joining stop, with preference by means of two joining stops. The joining stop or the joining stops are in this case those elements that cause the movement of the propellant charge modules in relation to one another in the course of the joining together to form a propellant charge.

Accordingly, it may be provided with particular preference that at least one joining stop is moved in a joining direction. Alternatively, however, it may also be advantageous if in the case of two joining stops both joining stops are moved in a joining direction. With regard to the movement in a joining direction, it should also be emphasized in this respect that the joining direction is to be understood rather more as a direction vector, instead of as a direction of movement. Accordingly, a first movement of a joining stop and an opposite movement of the joining stop has to be regarded as "in the joining direction", even if the movement is on the one hand directed toward the propellant charge modules and on the other hand directed away from the propellant charge modules.

It may likewise be advantageously provided that, during the joining movement for joining together the propellant charge modules to form a propellant charge, at least one spring-loaded joining stop is moved in the joining direction. The movement of a spring-loaded joining stop may serve particularly advantageously for the purpose of limiting the joining forces occurring when carrying out the joining movement for joining together the propellant charge modules to a maximum value, and consequently preventing damage to the propellant charge modules or the propellant charge. Likewise, it may be provided particularly advantageously that, for ascertaining the temperature, at least a front part of the sensor head passes through a clearance in a joining stop in the joining direction. In this case it may be provided on the one hand that the sensor head is moved with respect to the joining stop. On the other hand, it may also be provided that the joining stop is moved with respect to the sensor head.

In addition or alternatively, it may be provided particularly advantageously that the propellant charge modules carry out a movement in the joining direction with respect to the in particular immovable sensor head.

BRIEF DESCRIPTION OF THE DRAWING

Further advantages and details of the devices and methods according to the invention are explained below with the aid of the accompanying, schematic drawings, which represent exemplary embodiments and in which.

DETAILED DESCRIPTION

Figure 1:
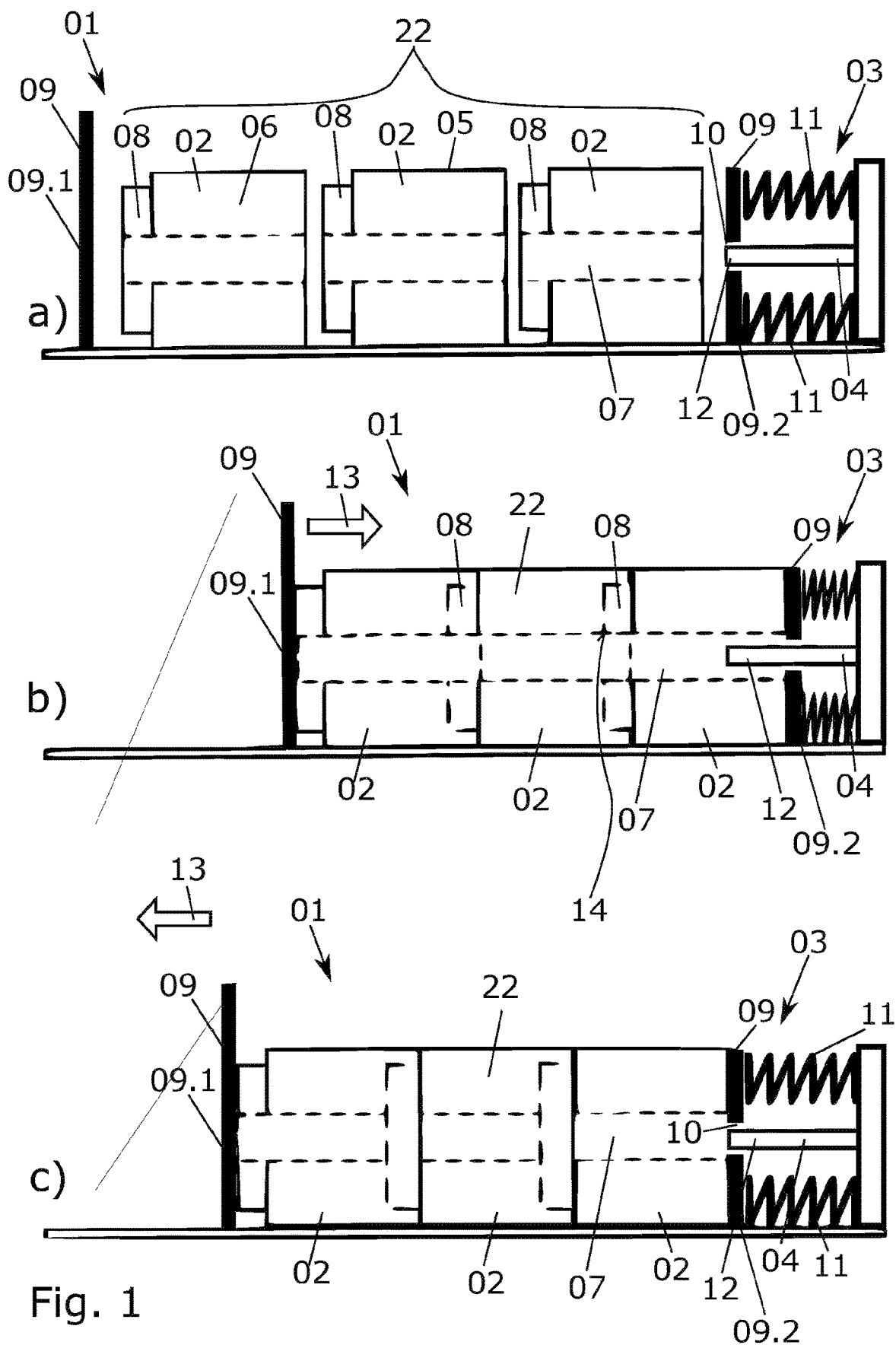
FIG. 1a shows a schematic representation of a joining device according to the invention in a first method state.
FIG. 1b shows a schematic representation of the joining device from FIG. 1a in a second method state.
FIG. 1c shows a schematic representation of the joining device from FIG. 1a in a third method state.

FIG. 1a shows a joining device 01 for joining together a number of propellant charge modules 02 to form a propellant charge, comprising a temperature ascertaining device 03 with a sensor head 04. The propellant charge 22 comprises for example propellant charge modules 02 with a solid paperboard tube 05, which receives the propellant 06 and moreover forms a cavity 07 arranged in the interior of the propellant charge module 02. In addition, the propellant charge modules 02 have coupling elements 08 formed on the outer side and on the inner side, only the coupling elements 08 that are formed on the outer surface being shown in the representation of FIG. 1. However, these serve together with a complementary design of the inner coupling elements for the purpose that, when joining together the propellant charge module 02 to form a propellant charge 22, an interlocking or frictional connection is established between the propellant charge modules 02. However, for this purpose it is required that the propellant charge modules 02 are moved with respect to one another in such a way that the coupling elements 08 can engage in one another.

The joining device 01 additionally comprises two joining stops 09, which are both designed as movable. The joining stops 09 are formed as a movable joining punch 09.1 and as a spring-loaded joining stop 09.2. The spring-loaded joining stop 09.2 has in this case a clearance 10. The clearance 10 in the joining stop 09.2 is in this case formed in such a way that a front part of the sensor head 04 can pass through the clearance and consequently through the joining stop 09. The movable design of the joining stops 09.1 and 09.2, in particular of the spring-loaded joining stop 09, achieves the effect that the sensor head 04, arranged immovably itself in the joining device 01, can move with respect to the propellant charge modules 02 or the propellant charge 22, that is to say can change its relative position in relation to the propellant charge 22 and consequently can be transferred from a rest position into a measuring position with respect to the propellant charge (22).

In the representation of FIG. 1a, the sensor head 04 is in the rest position with respect to the propellant charge modules 02 of the propellant charge 22. In the position of the joining device 01 that is shown, the propellant charge modules 02 of the propellant charge 22 have not yet been joined together to form a unitary propellant charge 22. In addition, in the situation of the method that is represented in FIG. 1a, no temperature ascertainment by means of the temperature ascertaining device 03 has taken place yet.

Following the situation of the method that is represented in FIG. 1a, at least one of the joining stops 09, specifically the joining punch 09.1, is moved toward the propellant charge modules 02, in order to carry out the joining together of the propellant charge modules 02 and the ascertainment of the temperature of the propellant charge 22.

In the situation of the method as represented in FIG. 1b, the non-spring-loaded joining punch 09.1 has already been moved in the joining direction 13 in such a way that the propellant charge modules 02 of the propellant charge 22 have come to lie in abutment with both joining stops 09, the complementary coupling elements 08 have been brought into engagement with one another and moreover the spring-loaded joining stop 09.2 has likewise been moved in the joining direction 13 with respect to the temperature ascertaining device 3, in particular also with respect to the sensor head 04.

As can be seen in FIG. 1b, as a result of the movement of the spring-loaded joining stop 09 in the joining direction 13, the front part 12 of the sensor head 04 is arranged in the cavity 07 of the propellant charge modules 02 joined together to form the propellant charge 22. According to the invention, in this relative position of the sensor head 04 with respect to the propellant charge 22, the preferably contactless ascertainment of the temperature of the inner surface 14 of the propellant charge 22 adjoining the cavity 07 of the propellant charge 22 takes place. This also means that, in the representation of FIG. 1b, the sensor head 04 has been transferred into the measuring position or is located in the measuring position with respect to the propellant charge 22.

It is also clear from a comparison of FIGS. 1a and 1b that the arrangement of the sensor head 04 in the cavity 7 of the propellant charge 22 can be accomplished even without a movement of the sensor head 04 with respect to the joining device 01. This is so because it may already be sufficient for arranging the sensor head 04 in the cavity 07 that the propellant charge 22 or the propellant charge modules 02 is/are moved with respect to the sensor head 04.

Alternatively, however, a design of the joining device 01 and of the temperature ascertaining device 03 in which the sensor head 04 is also moved in the joining device 01 and in the temperature ascertaining device 03 may also be provided. For this purpose, the sensor head 04 may for example comprise a drive or be drivable by a drive. Alternatively, the sensor head 04 may also be assigned to the joining punch 09.1. Then, the movement of the sensor head can be combined with the movement of the joining punch 09.1.

Generally, the joining movement of the propellant charge module or modules and the forces thereby occurring can also be utilized to accomplish a movement of the sensor head 04. For example, frictional forces on the outer surface of the propellant charge modules can be utilized to move the sensor head, in particular to tilt it into a measuring position.

In the situation of the method represented in FIG. 1c concerning the joining device 01 and the temperature ascertaining device 03, both the joining together of the propellant charge modules 02 to form the propellant charge 22 and the ascertainment of the temperature of the propellant charge 22 have been completed. A renewed movement of the non-spring-loaded joining punch 09.1 in the joining direction 13, but in the opposite direction from the representation in FIG. 1b, has the effect that the spring-loaded joining stop 09.2 is relieved and the springs 11 are at least partially relaxed.

As a result, the arrangement of the sensor head 04, in particular the front part 12 of the sensor head 04, with respect to the spring-loaded joining stop 09.2 and the clearance 10 arranged therein changes in such a way that the sensor head 04 is no longer arranged in the cavity 07 of the propellant charge 22 and the front part 12 of the sensor head 04 also no longer passes through the clearance 10 in the joining stop 09.2. This means that the temperature ascertaining device 03 has been transferred back into the rest position of the sensor head 4, without however the movement of the sensor head 04 itself with respect to the joining device 01 or the temperature ascertaining device 03 having taken place.

It can be seen from a comparison of FIG. 1a to 1c that, by the devices 01 and 03 according to the invention and on the basis of the methods described, an ascertainment of the temperature of the propellant charge 22 and joining together of the propellant charge modules 02 to form the propellant charge 22, or at least the carrying out of a joining movement, can particularly advantageously be performed at the same time or at least at overlapping times. Furthermore, the joining device 01 and the temperature ascertaining device 03 make it possible that the temperature of the propellant charge 22 can be measured particularly accurately, specifically in the cavity 07, in particular at the inner surface 14 of the propellant charge 22 adjoining the cavity.

It may be provided in the course of the operation of loading the weapon that the propellant charge 22 is introduced into the barrel of the weapon directly after the completion of the method outlined in FIG. 1a to 1c. Consequently, the ascertainment of the temperature of the propellant charge 22 is performed directly before the weapon is fired. As can likewise be easily seen from FIG. 1a to 1c, the method described can be carried out quickly. In particular the ascertainment of the temperature represented in FIG. 1b while the sensor head 04 is at least partially arranged in the cavity 07 of the propellant charge 22 can be performed within an extremely short time, with preference within one second or more quickly, and in this case have an accuracy of 1° C. or more.

Figure 2:
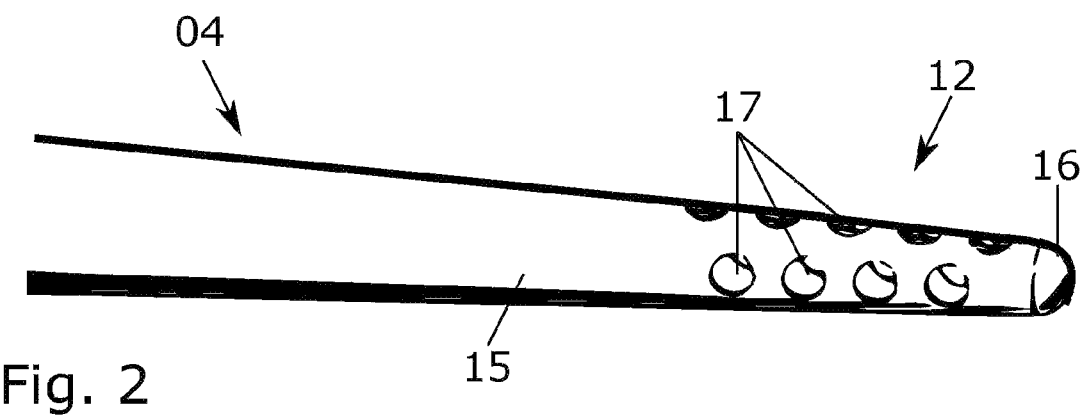
FIG. 2 shows a schematic representation of a sensor head according to a first embodiment.

FIG. 2 shows an enlarged schematic representation of a sensor head 04, the sensor head 04 comprising a front part 12, which, for carrying out the ascertainment of the temperature, is at least temporarily fitted in a cavity of a propellant charge. In order to have the mechanical stability needed for arranging the sensor head 4 in the propellant charge, the sensor head 04 comprises a housing 15, which tapers conically toward the front part 12 and has a hemispherical tip 16. Such a geometry of the sensor head 04 and/or of its housing 15 serves not only for the piercing of a pasteboard tube of a propellant charge but also for reducing the size of a corresponding clearance in a joining stop. In the representation of FIG. 2, the sensor head 4 additionally comprises a plurality of measuring openings 17, with which the ascertainment of the temperature in a cavity of the propellant charge can be carried out.

Figure 3:
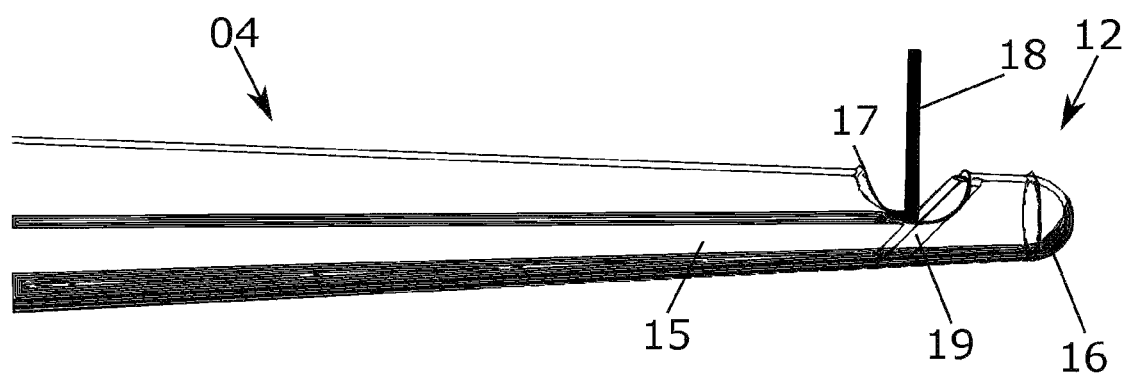
FIG. 3 shows a schematic representation of a sensor head according to a second embodiment.

FIG. 3 shows an alternative design of a sensor head 04, which likewise comprises a housing 15, which tapers conically toward the front part 12 and has a hemispherical tip 16. In the example of FIG. 3, the sensor head has only a single measuring opening 17. The measuring opening serves for the coupling in and coupling out of a measuring radiation 18. The measuring radiation 18 may in principle be any kind of electromagnetic waves that are suitable for temperature ascertainment.

The sensor head 04 of FIG. 3 also comprises an optical component 19, which serves for the guiding, coupling in and coupling out of the measuring radiation 18. It is ensured by the arrangement of the optical component 19 in the sensor head 04 of FIG. 3 on the one hand that the radiation coupled out from the sensor 04 impinges on an inner surface of a cavity of a propellant charge substantially at right angles and accordingly in the opposite direction impinges again on the optical component 19 and is consequently coupled into the sensor head 04. Within the sensor head 04, the measuring radiation runs substantially parallel to a main axis of symmetry, in particular a longitudinal axis of the sensor head 04. As a result, the measuring radiation 18 can emanate from a radiation source that is not represented and be conducted to a sensor of the sensor head 4 that is likewise not represented.

Figure 4:
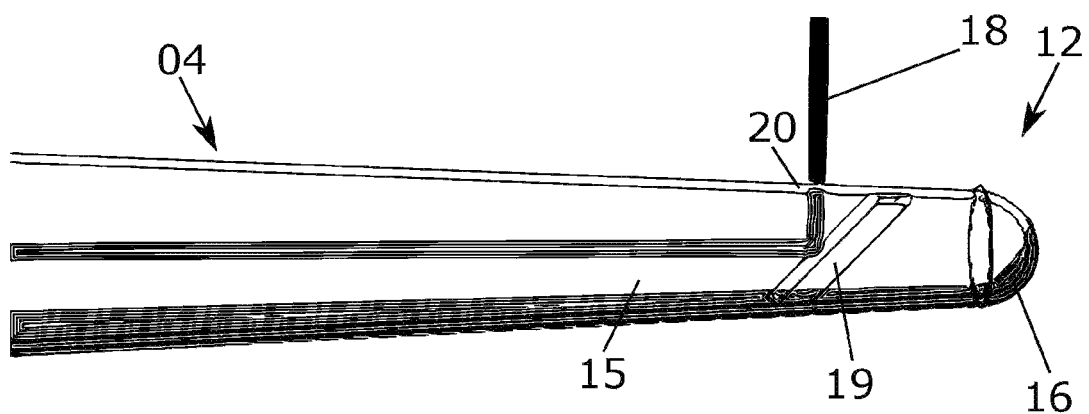
FIG. 4 shows a schematic representation of a sensor head according to a third embodiment.

FIG. 4 shows a sensor head 04 in a modified embodiment with respect to the representation of FIG. 3. The main difference between the representations of FIGS. 3 and 4 is the measuring opening 17 of the sensor head of FIG. 3, which the sensor head 04 of FIG. 4 does not have. The avoidance of the measuring opening 17 and the accompanying increase in the mechanical stability of the sensor head 04 of FIG. 4 are ensured by a correspondingly advantageous choice of the properties of the measuring radiation 18 on the one hand and a corresponding choice of material of the sensor head 04 in the coupling-in and coupling-out region 20. This is so because, depending on the choice of material of the housing 15, in particular in the coupling-in and coupling-out region 20, and a corresponding choice of the measuring radiation 18, the measuring radiation 18 can readily penetrate through or overcome the housing 15 in the coupling-in and coupling-out region 20.

REFERENCE SIGNS

01 Joining device
02 Propellant charge module
03 Temperature ascertaining device
04 Sensor head
05 Pasteboard tube
06 Propellant
07 Cavity
08 Coupling element
09 Joining stop 09.1 Joining punch
09.2 Spring-loaded joining stop
10 Clearance
11 Spring
12 Front part
13 Joining direction
14 Inner surface
15 Housing
16 Tip
17 Measuring opening
18 Measuring radiation
19 Optical component
20 Coupling-in and coupling-out region
22 Propellant charge

The invention claimed is:

1. A joining device configured for joining together propellant charge modules to form a propellant charge, at least one of the propellant charge modules having an interior cavity, the joining device comprising:
at least one joining stop movable toward the propellant charge modules to join the propellant charge modules to form the propellant charge;
a temperature ascertaining device that ascertains a temperature of the propellant charge;
the temperature ascertaining device including a sensor head, which is variable in position relative to the propellant charge, for ascertaining the temperature of the propellant charge and is at least temporarily arranged in the interior cavity of the module simultaneously while the at least one joining stop moves to join together the propellant charge modules to form the propellant charge.

2. The joining device as claimed in claim 1, wherein the temperature ascertained by the sensor head is a temperature of an inner surface of the propellant charge adjoining the cavity.

3. The joining device as claimed in claim 1, wherein the temperature ascertaining device measures the temperature of the propellant charge within one second or less to an accuracy of within 1° C. or more accurately.

4. The joining device as claimed in claim 1, wherein the sensor head comprises a sensor for contactless ascertainment of the temperature.

5. The joining device as claimed in claim 1, wherein the sensor head further comprises optical components, which serve at least for guiding and/or coupling out and/or coupling in measuring radiation on the basis of which the ascertainment of the temperature is performed.

6. The joining device as claimed in claim 5, wherein the optical components are arranged such that, when there is coupling out of the measuring radiation from the sensor head, the measuring radiation impinges on the inner surface of the propellant charge substantially at right angles.

7. The joining device as claimed in claim 1, further comprising a communication interface, with which the temperatures ascertained are transmitted to a fire control device.

8. The joining device as claimed in claim 1, further comprising a second joining stop, which together with the at least one joining stop joins together the propellant charge modules to form a propellant charge.

9. The joining device as claimed in claim 8, wherein the at least one joining stop moves in a joining direction to join the propellant charge modules to form the propellant charge.

10. The joining device as claimed in claim 9, wherein the at least one joining stop comprises a clearance, which is dimensioned such that at least a front part of the sensor head passes through the clearance as the at least one joining stop moves in the joining direction.

11. The joining device as claimed in claim 9, wherein the at least one joining stop is spring-loaded in the joining direction.

12. The joining device as claimed in claim 9, wherein the sensor head is immovable in the joining direction.

13. A method for forming a propellant charge, the method comprising:
joining together a plurality of propellant charge modules, at least one of propellant charge modules having an interior cavity, to form the propellant charge by moving at least one joining stop;
at least temporarily arranging a sensor head which is variable in position relative to the propellant charge modules in the interior cavity of the propellant charge module simultaneously with moving the at least one joining stop joining together the plurality of the propellant charge modules to form the propellant charge; and
ascertaining the temperature of the propellant charge at least while the sensor head is arranged in the interior cavity of the propellant charge module simultaneously with the at least one joining stop joining together the propellant charge modules to form the propellant charge.

14. The method as claimed in claim 13, wherein the temperature ascertained is a temperature of an inner surface of the propellant charge adjoining the interior cavity.

15. The method as claimed in claim 14, wherein the temperature of the propellant charge inner surface is ascertained within one second or less to an accuracy of within 1° C. or more accurately.

16. The method as claimed in claim 14, wherein the temperature of the inner surface of the propellant charge is measured without contacting the propellant charge.

17. The method as claimed in claim 13, wherein the ascertainment of the temperature is performed by measuring radiation which is at least guided and/or coupled out and/or coupled in by means of optical components of the sensor head.

18. The method as claimed in claim 17, wherein, when there is coupling out of the measuring radiation from the sensor head, the measuring radiation impinges on the inner surface of the propellant charge substantially at right angles.

19. The method as claimed in claim 13, wherein the temperature ascertained is transmitted by means of a communication interface to a fire control device.

20. The method as claimed in claim 13, wherein the joining together a plurality of the propellant charge modules includes moving the at least one joining stop and a second joining stop.

21. The method as claimed in claim 20, wherein joining together a plurality of propellant charge modules includes moving the at least one joining stop in a joining direction to join the propellant charge modules to form the propellant charge.

22. The method as claimed in claim 21, wherein joining together a plurality of propellant charge modules moving the at least one joining stop, which is a spring-loaded joining stop, in the joining direction.

23. The method as claimed in claim 21, wherein ascertaining the temperature of the propellant charge includes passing at least a front part of the sensor head through a clearance in the at least one joining stop in the joining direction.

24. The method as claimed in claim 13, wherein joining together the plurality of the propellant charge modules includes moving the at least one joining stop wherein the sensor head is immovable relative to the at least one joining stop.

* * * * *